United States Patent [19]

Iiga et al.

[11] Patent Number: 5,044,646
[45] Date of Patent: Sep. 3, 1991

[54] SCOOTER TYPE VEHICLE

[75] Inventors: Tsuyoshi Iiga; Yasuji Kitasei; Junji Kikuno; Nobuo Yamaguchi, all of Saitama; Yoshio Nakagomi, Tokyo; Takeo Miura, Saitama, all of Japan

[73] Assignee: Honda Giken Kogyo Kabushiki Kaisha, Tokyo, Japan

[21] Appl. No.: 296,881

[22] Filed: Jan. 12, 1989

Related U.S. Application Data

[63] Continuation of Ser. No. 946,739, Dec. 24, 1986, abandoned.

[30] Foreign Application Priority Data

| Dec. 27, 1985 | [JP] | Japan | 60-294508[U] |
| Jun. 6, 1986 | [JP] | Japan | 61-85466[U] |
| Sep. 30, 1986 | [JP] | Japan | 61-149862[U] |

[51] Int. Cl.$^5$ .............................................. B62J 7/02
[52] U.S. Cl. .................................. 180/219; 180/225; 180/228; 296/37.1
[58] Field of Search ............... 180/219, 226, 225, 230, 180/228, 229; 296/37.1, 37.8, 37.15; 224/275, 273; 280/835

[56] References Cited

U.S. PATENT DOCUMENTS

| 2,225,914 | 12/1940 | Lewis et al. | |
| 3,779,597 | 12/1973 | Uchida | 296/37.15 |
| 3,788,532 | 1/1974 | Bish | 224/32 A |
| 3,944,009 | 3/1976 | Katagiri | 280/288.4 |
| 4,438,877 | 3/1984 | Jackson | 224/275 |
| 4,441,574 | 4/1984 | Kohyama et al. | 180/219 |
| 4,487,283 | 12/1984 | Suzuki et al. | 280/288.2 |
| 4,522,442 | 6/1985 | Takenaka | 296/37.1 |
| 4,577,719 | 3/1986 | Nomura | 280/5 A |
| 4,579,190 | 4/1986 | Hashimoto | 180/228 |
| 4,697,664 | 10/1987 | Kohyama | 180/226 |
| 4,802,682 | 2/1989 | Yasuji | 296/37.1 |
| 4,817,749 | 4/1989 | Montano | 180/119 |
| 4,901,813 | 2/1990 | Kimura et al. | 180/230 |
| 4,964,483 | 10/1990 | Yokoyama et al. | 180/219 |

FOREIGN PATENT DOCUMENTS

| 3308602 | 9/1984 | Fed. Rep. of Germany | 180/219 |
| 2532897 | 3/1984 | France | |
| 477708 | 2/1953 | Italy | |
| 516776 | 2/1955 | Italy | 180/225 |
| 61-210987 | 6/1985 | Japan | |
| 60-154964 | 8/1985 | Japan | |
| 0577488 | 5/1946 | United Kingdom | 280/288.2 |
| 742766 | 1/1956 | United Kingdom | 180/225 |
| 800488 | 8/1958 | United Kingdom | |
| 819690 | 9/1959 | United Kingdom | |
| 1537233 | 12/1978 | United Kingdom | |
| 2054477 | 2/1981 | United Kingdom | |

Primary Examiner—Charles A. Marmor
Assistant Examiner—Anne Marie Boehler
Attorney, Agent, or Firm—Lyon & Lyon

[57] ABSTRACT

A motor scooter with an enlarged storage compartment that decreases the overall bulk and weight of the vehicle. The storage compartment is effectively sealed to prevent water or spilled fuel from leaking therein, yet provides easy access to the engine located beneath it for purposes of maintenance and inspection. The contents of the storage compartment are protected from the heat generated by the engine which is in close proximity by an insulating wall construction.

30 Claims, 12 Drawing Sheets

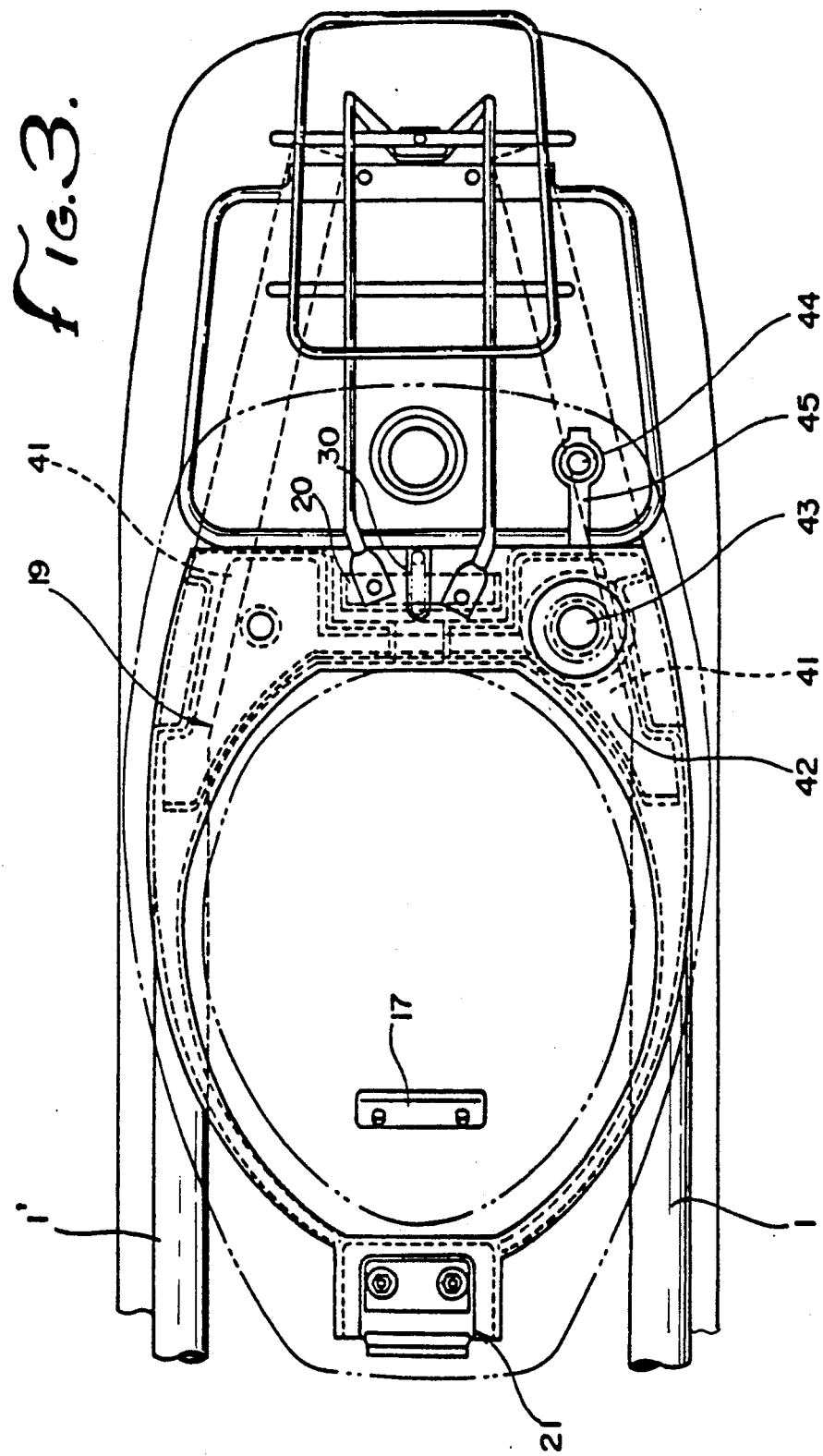

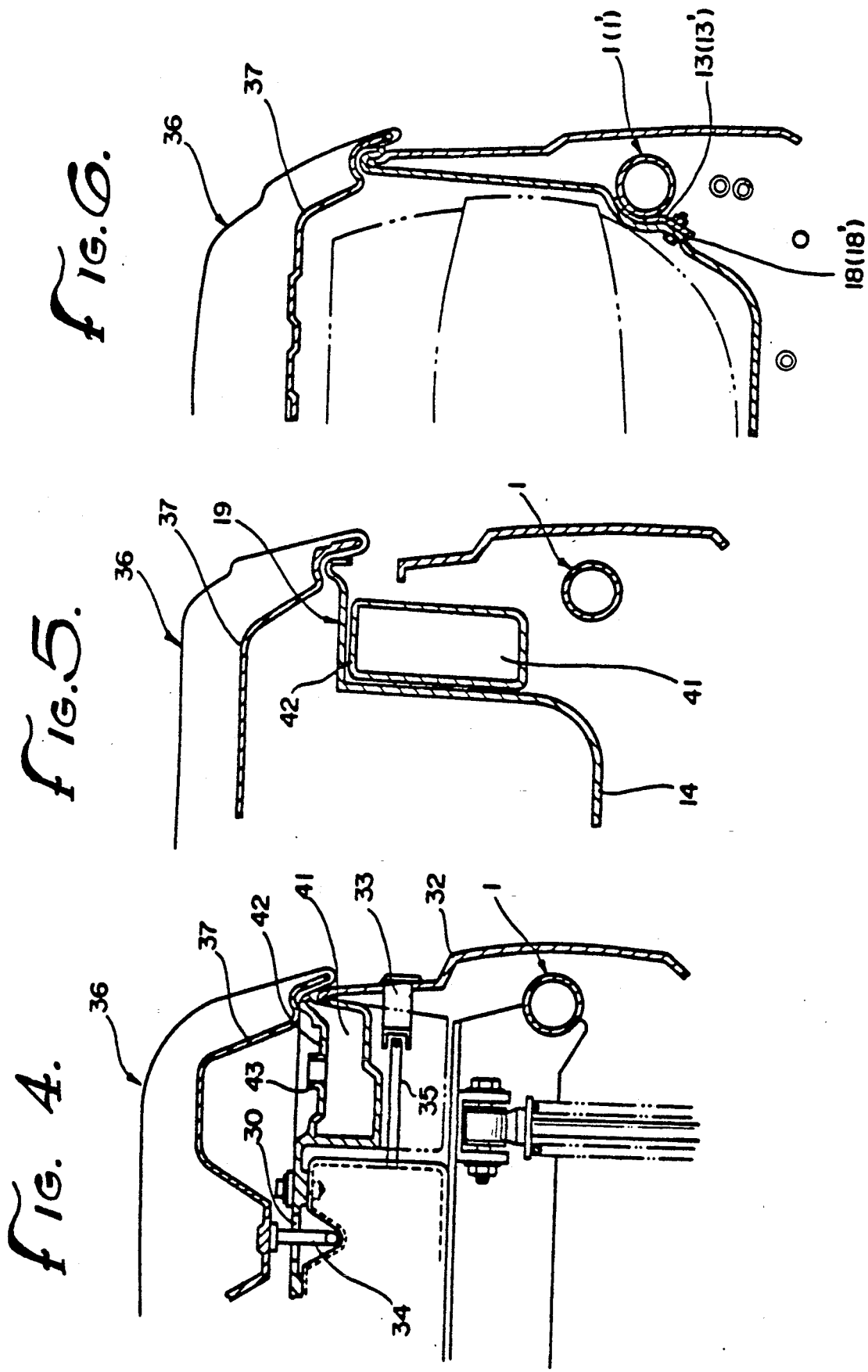

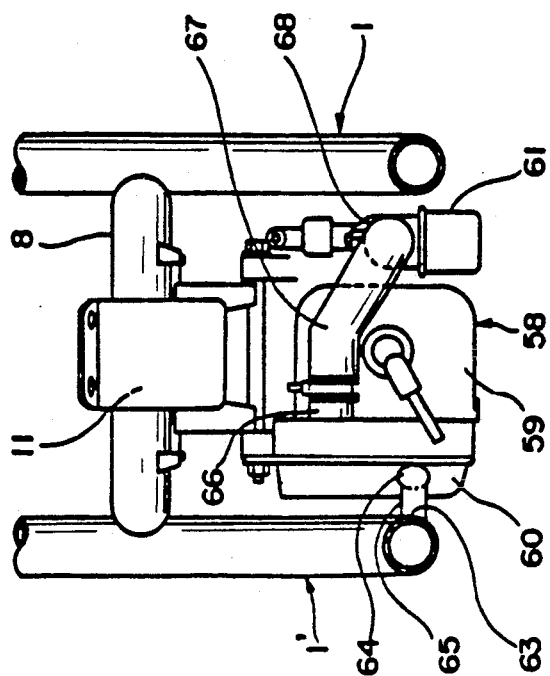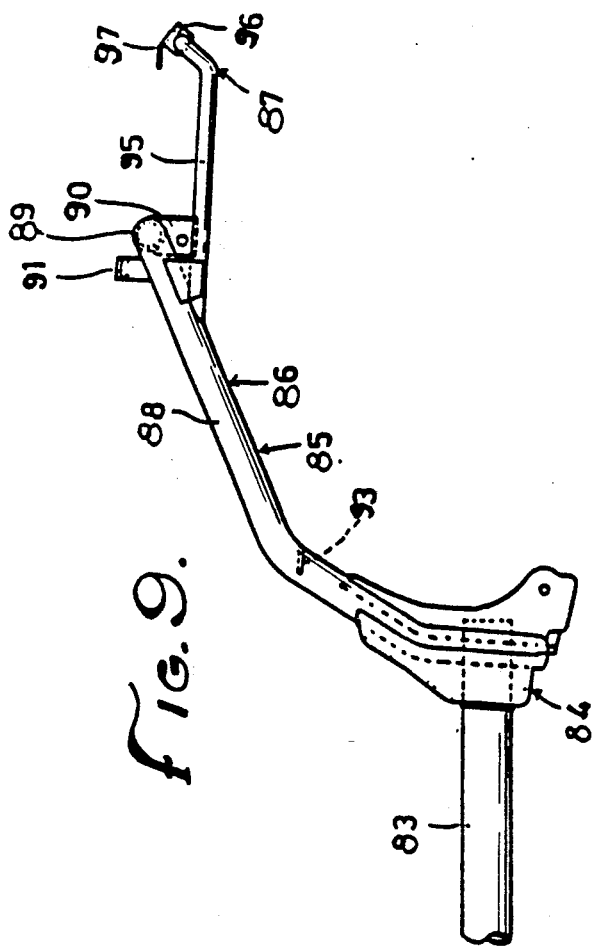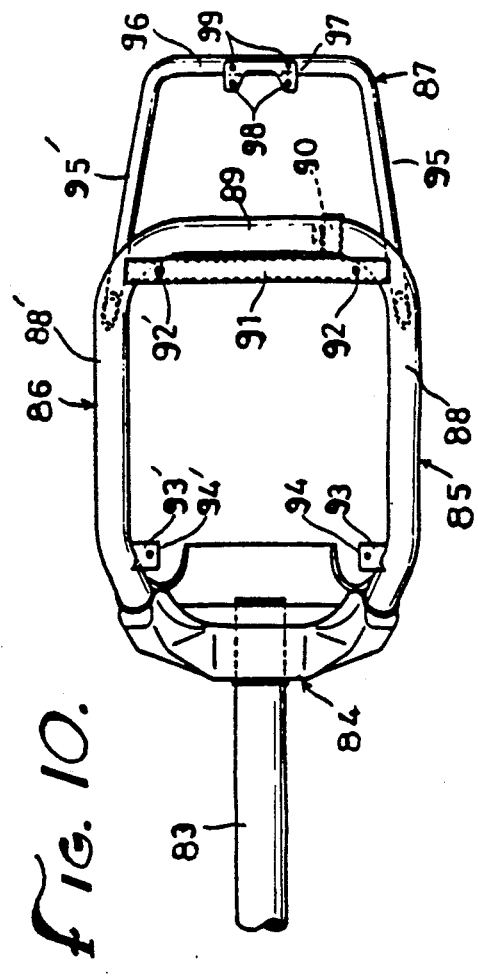

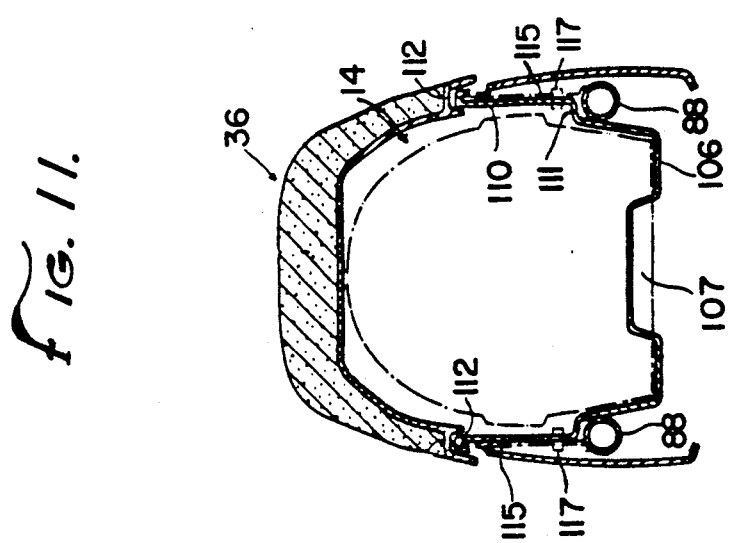
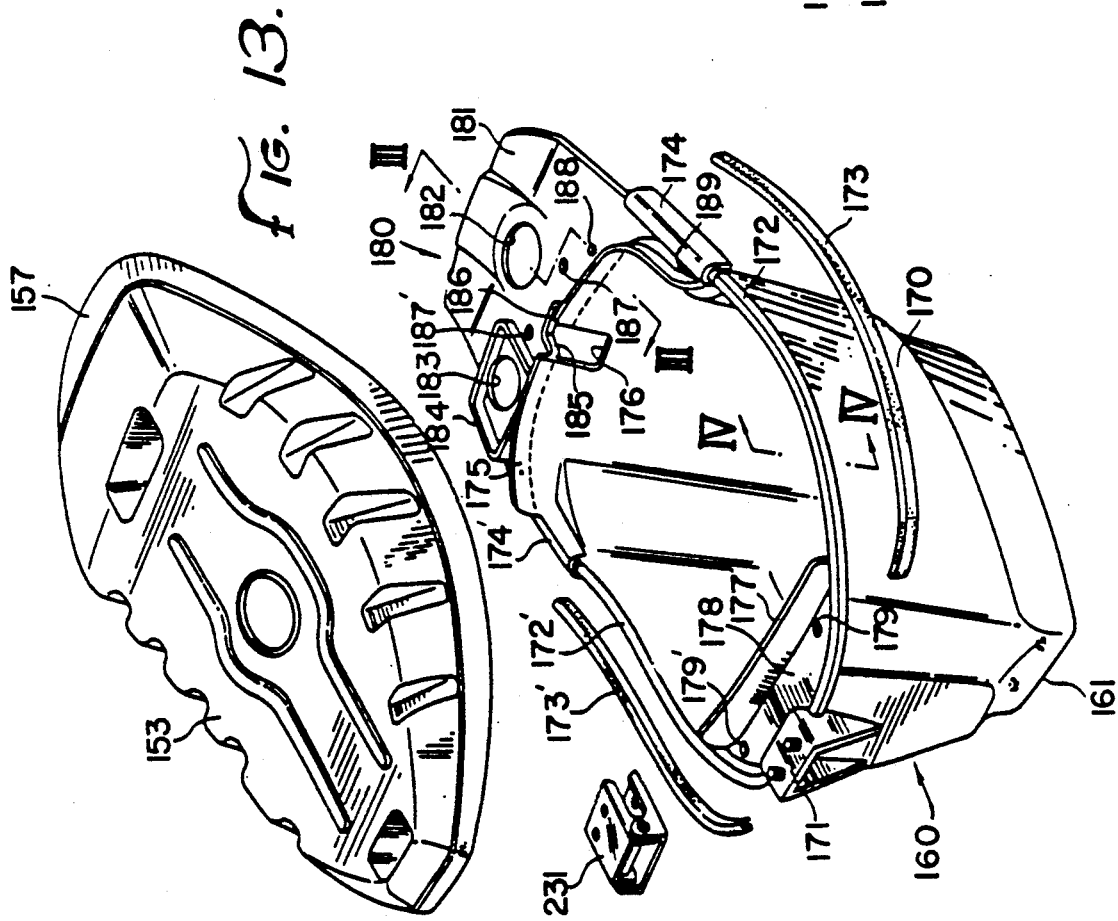

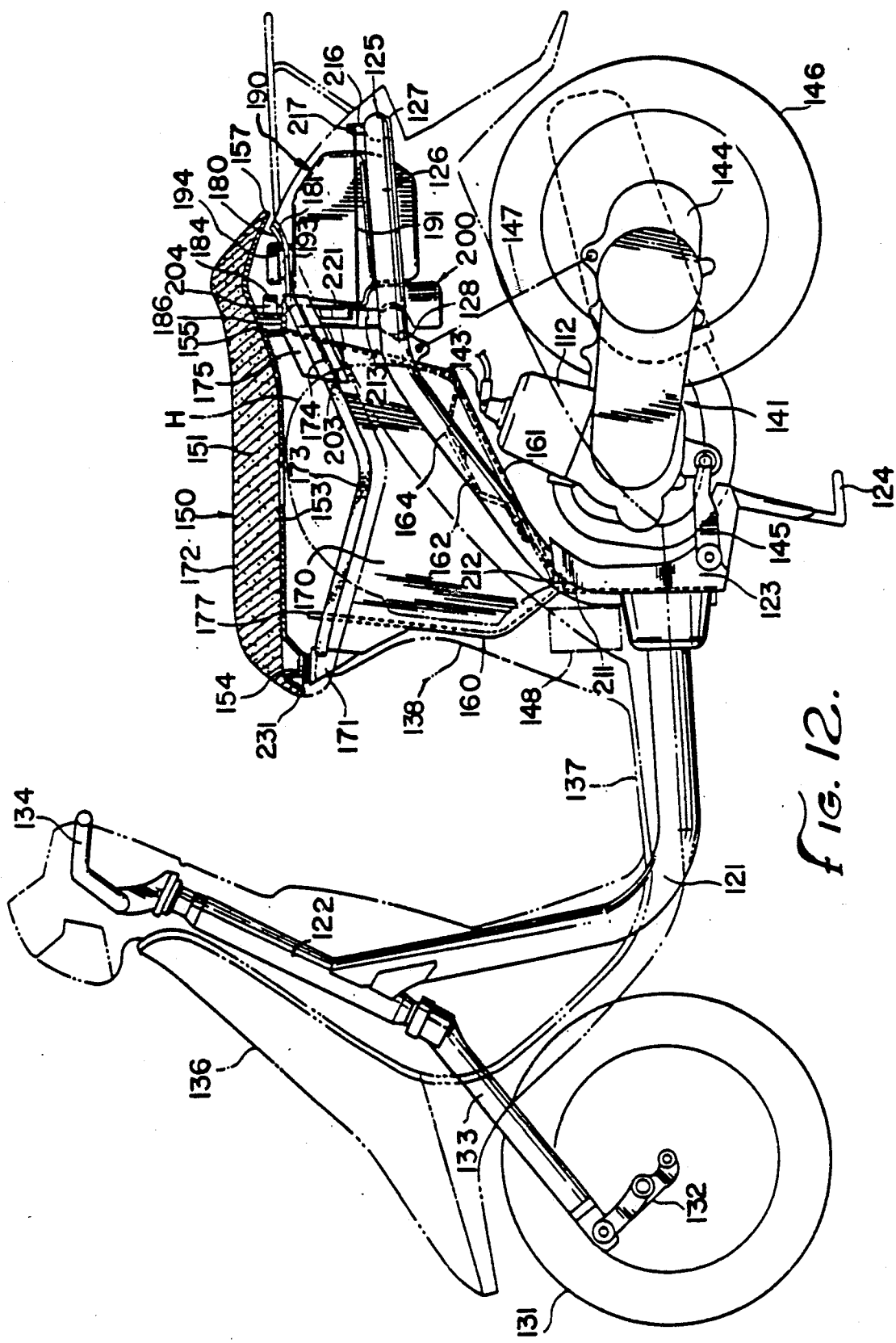

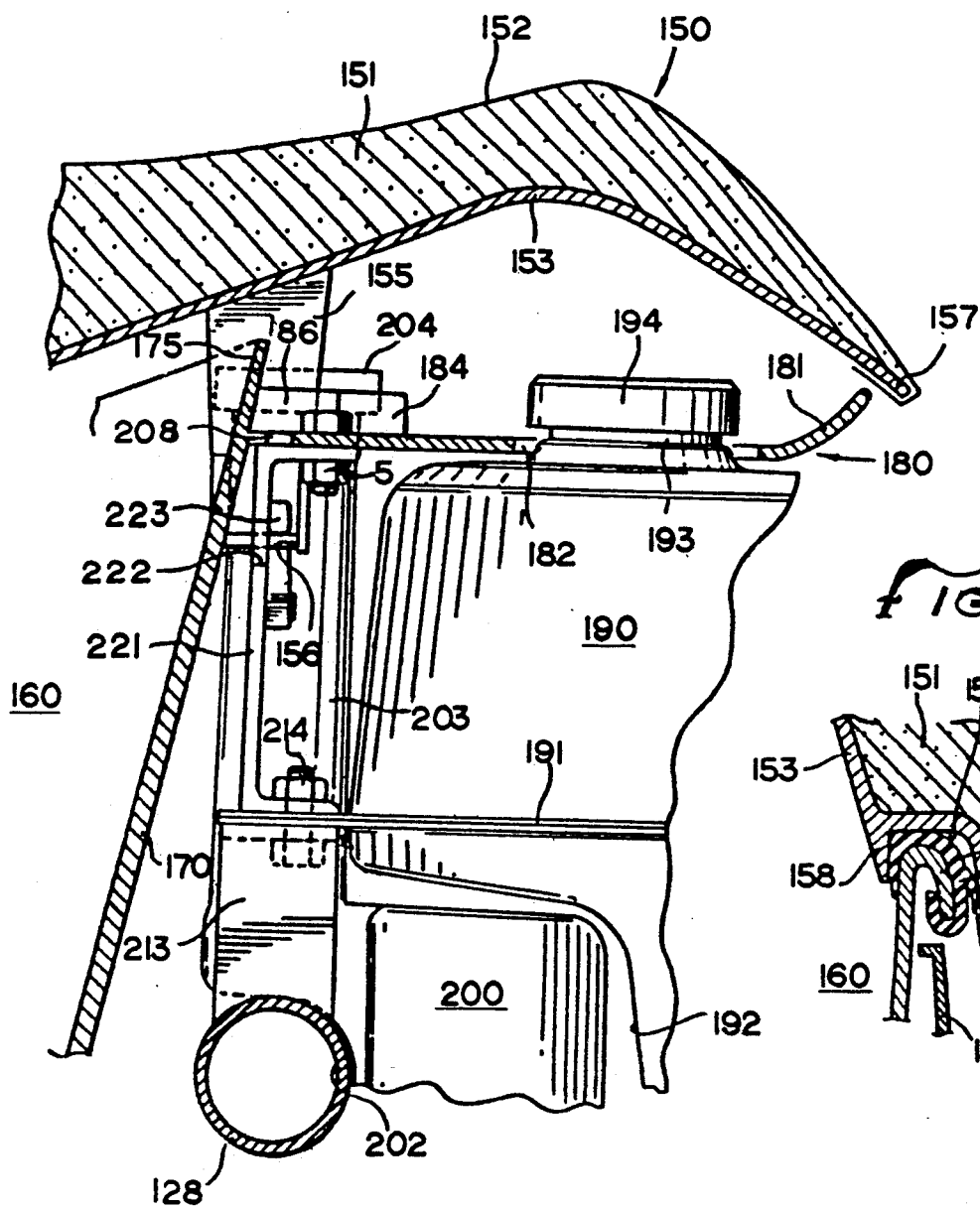

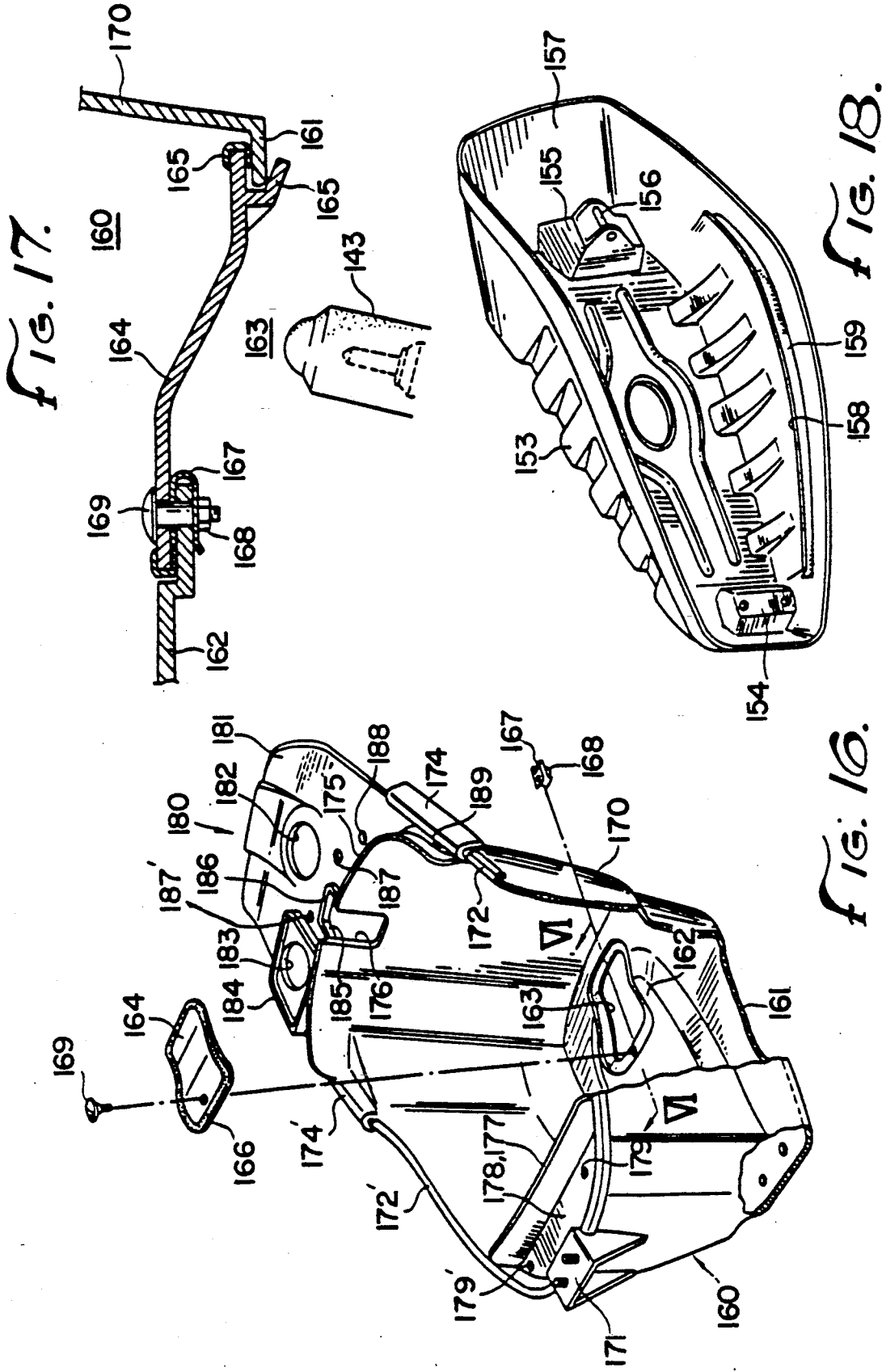

SCOOTER TYPE VEHICLE

This application is a continuation of application Ser. No. 946,739 filed Dec. 24, 1986, now abandoned.

BACKGROUND OF THE INVENTION

The field of the present invention is layout design for motorcycles.

Motorcycles, particularly scooter type motorcycles, are generally provided with a rear cover which covers an engine and a rear wheel. More particularly, a scooter type of motorcycle in which an engine is placed substantially in front of the rear wheel, an exhaust muffler placed to the side of a rear wheel and a power unit comprised of the engine and a transmission pivotally connected to the body frame and attached to the rear wheel at its other end with a shock absorber placed between the transmission and the body frame is disclosed in U.S. Pat. No. 4,441,574. A similar motor scooter is disclosed in Belgian Patent No. 556,184. However, several problems with motor scooters with this general mechanical arrangement have remained unsolved.

There was in the past a scooter type vehicle which had side frames that extended outwardly from the foot rest to the upper edge of a rear wheel. Bracket supports extended upwardly from this frame to support a seat. A storage compartment was disposed between the seat and the frame. Several problems were encountered by this arrangement including the weight and bulk of the support brackets, the limited amount of room available for the storage compartment, and the fact that the seat and storage compartment had to be removed before the engine could be reached for maintenance or repair.

In motor scooters of the prior art, the storage compartment was limited to such a size as to be unable to accommodate the larger, full face rider helmets. The storage compartment could not be enlarged for several reasons. If the storage compartment were enlarged toward the rear, it was too close in proximity to the fuel tank, and there was the possibility that fuel would splash into the storage compartment. Also, if the storage compartment were expanded toward the engine, there was a danger that the heat from the engine would damage the contents within the storage compartment. Obviously, if the storage compartment were expanded upwardly, the seat would be too high to comfortably accommodate smaller riders.

SUMMARY OF THE INVENTION

The present invention is directed to a motor driven scooter which contains an enlarged storage compartment while decreasing the overall weight and bulk of the vehicle. The motor driven scooter is further equipped with a splash plate to prevent fuel from splashing into the compartment from the fuel inlet. The storage compartment can be further equipped with a double wall with an air space between the wall layers which insulates the interior of the storage compartment caused by the compartment's proximity to the engine. The invention also provides for a motor scooter in which the engine can be reached for maintenance and inspection without removing the seat or the storage compartment, by allowing for access through the bottom of the storage compartment.

BRIEF DESCRIPTION OF THE DRAWINGS

FIG. 3 is a plan view of the upper portion of this invention looking downward;

FIG. 4 is a sectional view of along line IV—IV of FIG. 2;

FIG. 5 is a sectional view along line V—V of FIG. 2;

FIG. 6 is a sectional view along line VI—VI of FIG. 2;

FIG. 8 is a sectional view along line VIII—VIII of FIG. 1;

FIG. 9 is a side view showing the frame of an alternate embodiment of the invention;

FIG. 10 is a plan view thereof;

FIG. 11 is a sectional view of the alternative embodiment along line VI—VI of FIG. 2;

FIG. 12 is a side view of a third embodiment of the invention;

FIG. 13 is an exploded view of the storage box and seat bottom plate;

FIG. 14 is a sectional view along line III—III of FIG. 13;

FIG. 15 is a sectional view along line IV—IV of FIG. 13;

FIG. 16 is an oblique view of the storage box, partially cut out to show the appearance when the inspection lid is removed;

FIG. 17 is a sectional view along line VI—VI of FIG. 16;

FIG. 18 is an oblique view showing the underside of the seat bottom plate;

DETAILED DESCRIPTION OF THE PREFERRED EMBODIMENT

Figure 1:
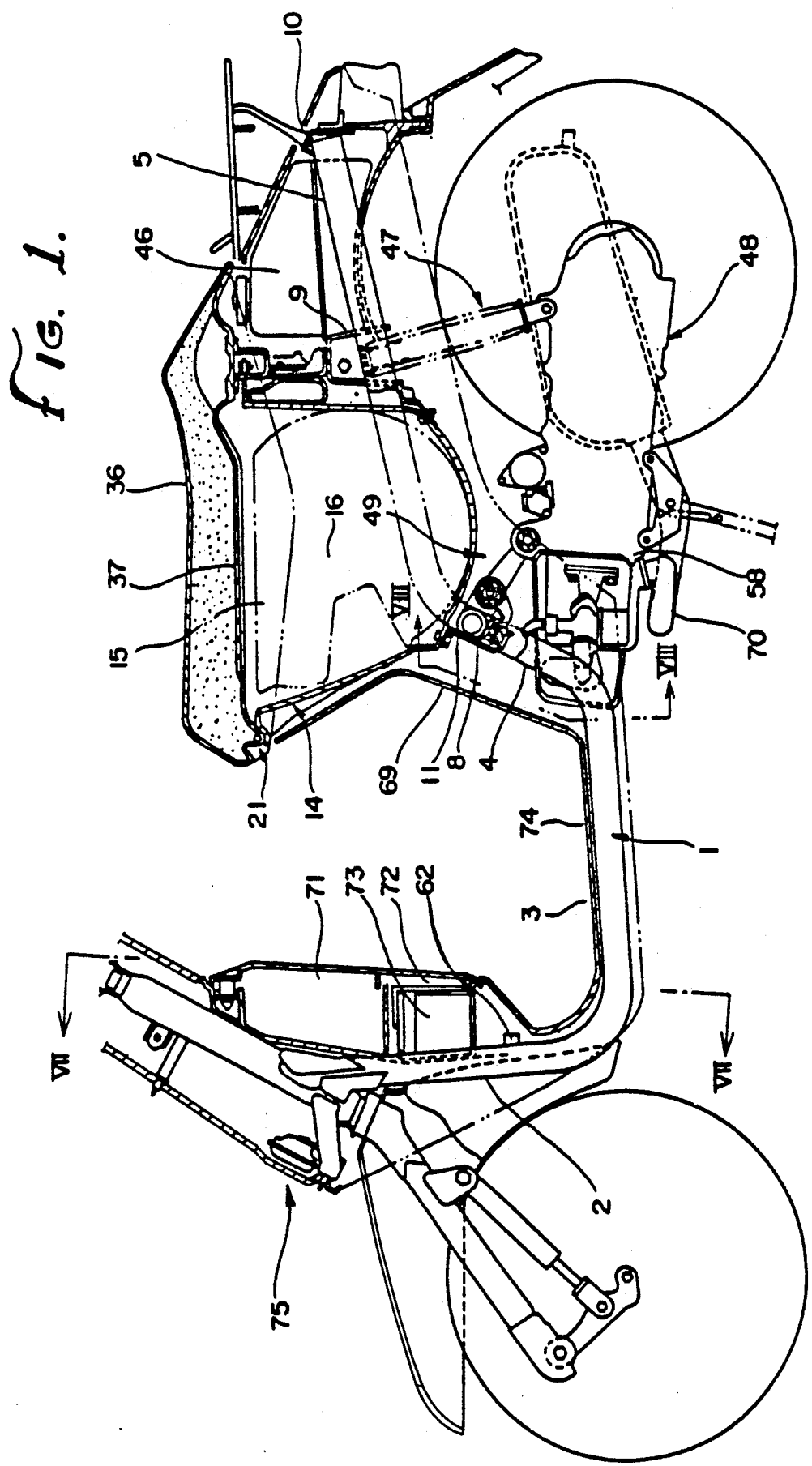
FIG. 1 is a side view, partially in section, showing an embodiment of this invention.
Figure 7:
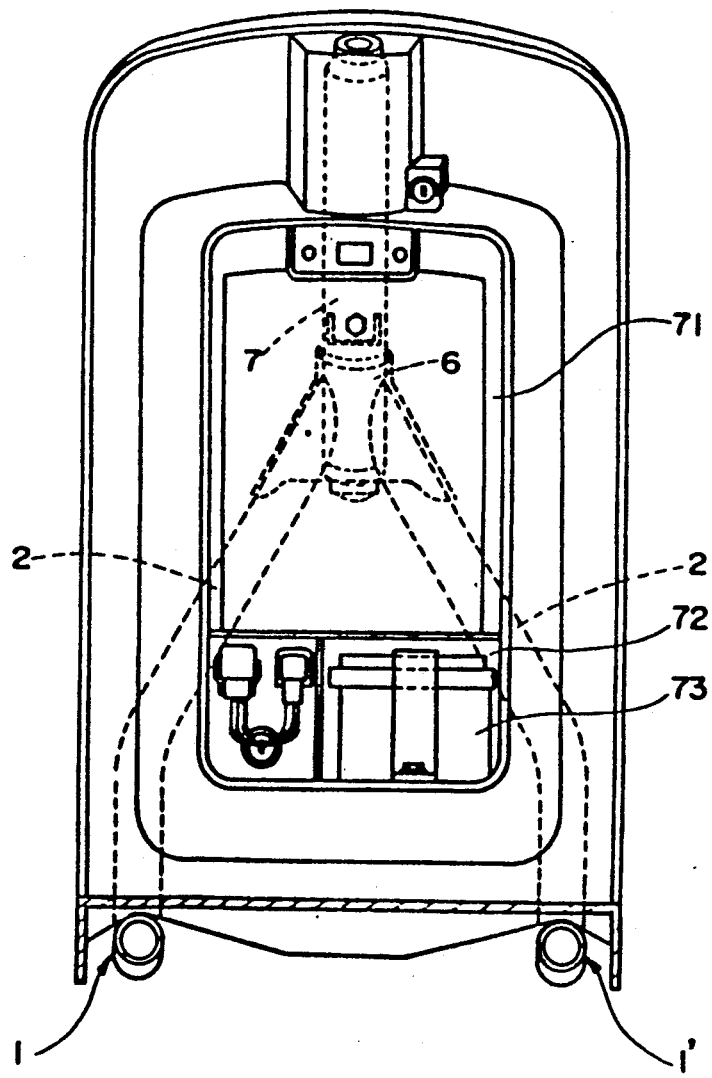
FIG. 7 is a sectional view along line VII—VII of FIG. 1.

Turning in detail to the drawings, FIG. 1 shows a side view, partially in section, of the scooter type vehicle in accordance with this invention. The left hand and right hand frames 1, 1' are made of pipe material and have a front rising section 2, an intermediate section 3, an intermediate rising section 4 and a rear section 5. These sections are connected to each other at the end of the front rising sections 2, with a bearing member fastened to a connection 6. (See FIG. 7).

The left hand and right hand frames 1, 1' are connected to each other with a cross member 8 at the upper part of the intermediate rising section 4.

Between the intermediate portions of the rear section 5 of the left hand and right hand frames 1, 1' there is a bracket 9, and between the rear end of the rear section 5 is fixed another bracket 10. A front mounting bracket 11 is fixed to the cross member 8.

Mounting bracket 12 is fastened to bracket 9. Mounting brackets 13 and 13' are fastened to the rear section 5 of the left hand and right hand frames, 1, 1' at approximately the middle portion thereof. A trunk 14 forms a storage base 16 capable of storing a helmet 15. Seating mounts 17, 18, and 18' are provided respectively on the bottom front, left hand and right hand sides of the bottom of the trunk 14. A side panel section 19 is formed on the upper rear edge of the trunk 14, with a seating mount 20 and a cut-out 30 being formed at the rear of the panel section 19. An oil tank 41 is located immediately to the rear of trunk 14. As shown in FIG. 3, a circular opening in the top wall 42 of the panel section 19 is provided and a filler opening 43 for the oil tank 41 is inserted in the opening in a closed fit condition. A plug 44 for the filler opening 43 is attached to the side panel 19 via a connecting portion 45, the plug 44 being fitted to the filler opening 43 by bending the connecting portion 45, which is made of a flexible material. A hinge 21 is provided on that portion of the side panel section 19 that is located near the front center of the trunk 14.

The hinge 21 has a base piece 22 and a middle fold piece 23 which are connected. The middle fold piece 23 being bent and placed upon the base piece 22, the pieces being fastened together with the bolts 24. A hinge pin 25 is placed between the base piece 22 and the middle fold piece 23 (see FIG. 2). The trunk 14 is attached to frames 1, 1' with the seating mount 17 at the bottom front of the trunk 14 fastened to the front bracket 11. The seating mounts 18 and 18' at the bottom left and right hand portions of the trunk 14 are attached to the mounting brackets 13 and 13'. The seating mount 20 of the side panel section 19 is attached to support bracket 12. Bolts 26, 27 and 28 respectively are used to attach the above-mentioned seating mounts to their respective brackets. The fastening of bolts 26, 27, and 28 can be accomplished from the inside of the trunk 14, and the top side of the side panel section 19 (see FIG. 6).

Figure 2:
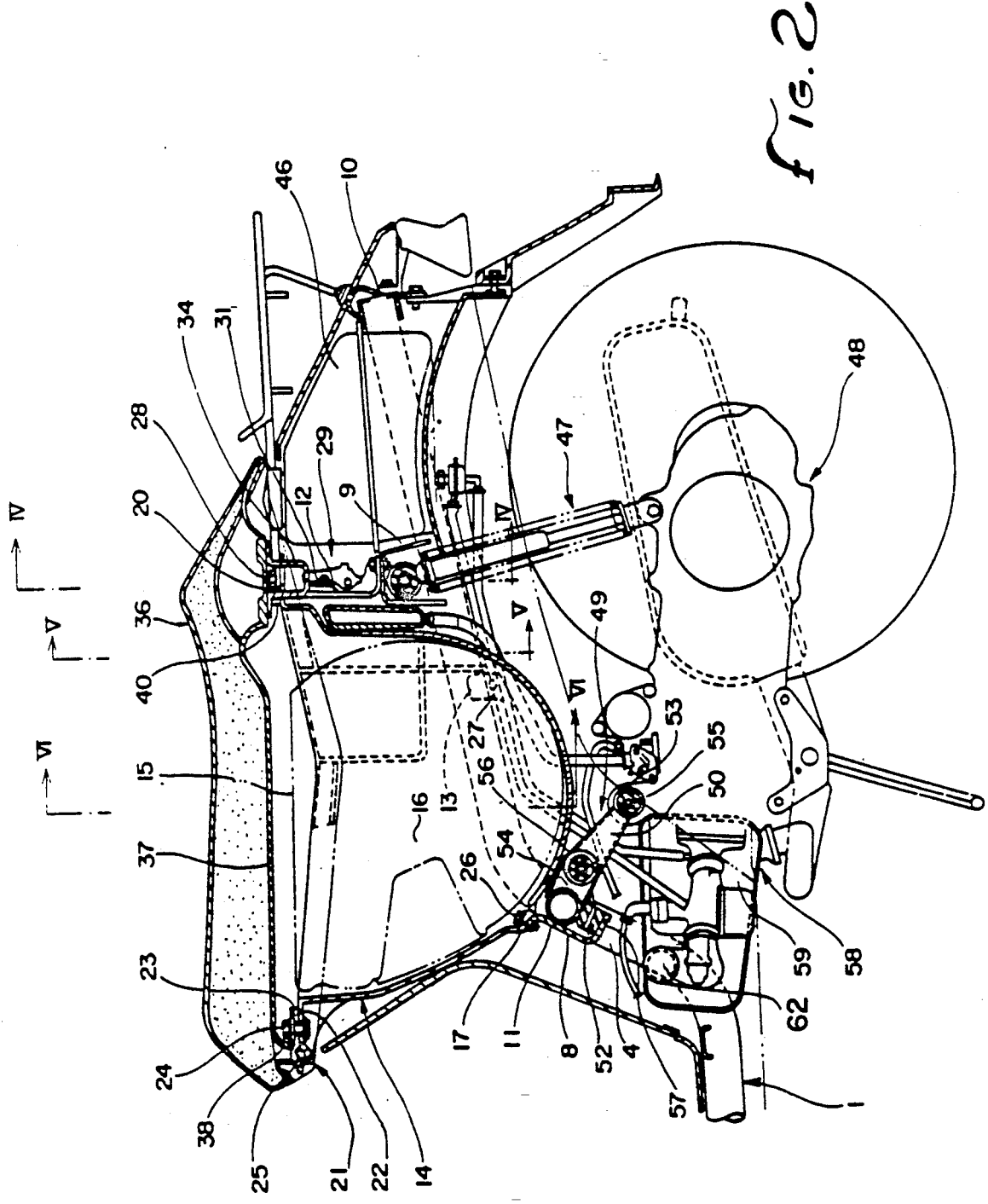
FIG. 2 is a longitudinal sectional view of the rear portion of this invention.

FIG. 2 also shows a seat lock mechanism 29. The mechanism 29 has a hook engaging lever 31 which is swingably mounted on the support bracket 12. A key inserted into release mechanism 33 operates to release the hook 34 which is engaged by lever 31. A connecting rod 35 connects the key release mechanism 33 to the hook engaging lever 31 (see FIG. 4). A seat 36 is provided which is mounted as shown at 38 and 34. Cushioning 40 is provided at the rear left and right of the seat frame 37.

The seat 36 can be pivoted forward using the hinge pin 25 as a pivot point. The seat 36 can only be pivoted forward when the hook 34 is disengaged from the hook lever 31 of the seat lock mechanism 29. The cushioning 40 is pressed against the top of the side panel section 19 of the trunk 14 to prevent the seat from shaking when locked on top of the trunk 14.

Also to the rear of trunk 14 is a fuel tank 46.

Intermediate bracket 9 attached to frames 1, 1' supports the rear portion of a power unit 48 through left hand and right hand suspension mechanisms 47, and 47'. The front portion of the power unit 48 is supported by the cross frame 8 through a hanger link mechanism 49. The hanger link mechanism 49 has a swing link 50 and a stopper rubber 52 attached to swing link 50 by an arm 51. Swing link 50 is connected to bracket 53 of the power unit 48 which is attached to the shaft 55. Swing link 50 is connected to bracket 54 of the cross frame 8 at pivot shaft 56. Stopper rubber 42 abuts stop 57 of the intermediate bracket 8. FIG. 8 shows the power unit 48 is equipped with a horizontal type engine 58, an air cleaner 60 placed to the right side of a cylinder 59, and a carburetor 56 placed to the left side of the cylinder 59. An intake port 62 is provided in the middle of the front rising section of the right hand frame 1' and an intake outlet 63 is attached to the intermediate section of the right hand frame 1'.

The intake outlet 63 is connected to the intake inlet 64 of the air cleaner 60 through a fresh air duct 65 of the bellows type. An intake outlet 66 of the air cleaner 60 is connected to an intake inlet 68 of the carburetor 61 by a connecting tube 67. The connecting tube 67 is located in front of the cylinder 59 of the engine 58.

Also provided in this embodiment are a body cover 69, an exhaust muffler 70, a glove compartment 71, storage compartment 72 for a battery 73. Also a foot rest 74 which is of the low bed step floor platform type and a steering unit 75 are provided.

To reach the engine for maintenance in this embodiment seat 36 is pivoted forward with a hinge 21 acting as a pivot point. The trunk 14 must then be removed from the frames 1, and 1' by removing the bolts 26, 27 and 28, together with the seat 36.

In an alternative embodiment the trunk 14 is sufficiently large to store a full face helmet. To accomplish this there is shown in FIG. 9 a rear frame 85 that extends downward from a head pipe rising upward between the foot rest and the power unit 48. The helmet storage box which was the trunk of the previous embodiment 14 has a bottom wall 106 that slants downward toward the front of the motorcycle. The main pipe 83 is connected to the rear frame 85 through joint 84. The rear frame 85 has a main frame 86 that extends rearwardly upwardly from the joint 84 and an extension frame 87. The main frame 86 is formed by a single pipe bent into a U-shape with a side pipe portion 88 and a cross pipe portion 89. A shock absorber bracket 90 is welded to the middle of the cross pipe portion 89 and faces downward. A tank fixing bracket 91 is welded to the top of side pipes 88 and 88' slightly forwardly of the cross pipe 89. Tank fixing holes 92 and 92' are drilled into the top of the tank fixing bracket 91. To the forward parts of the side pipe 88 are welded trunk brackets 93, 93' with trunk fixing holes 94, 94' drilled therein (See FIG. 10).

The extension frame 87 is also made by bending a single pipe into substantially a U-shape forming a pair of side pipes 95 and a cross pipe 96. A bracket 97 is welded onto the cross pipe 96, the bracket having a tank fixing hole 98 and a rear body fixing hole 99 drilled therein. The helmet storage box or trunk 14 has a bottom wall 106 that slants from the top of the engine 58 to the maximum lift position of the rear wheel 100. An indented portion 107 is provided at the center of the bottom surface 106. The indented portion 107 prevents the bottom wall 106 from contacting a small projection from the engine 58 such as a spark plug, which projects toward the trunk 14. The front wall 160 (see FIG. 12) of the trunk 14 may be tilted forwardly to increase the inner dimension of the trunk 14. The sidewall 110 has a step portion 111 allowing the bottom wall 106 to extend lower than the side pipes 88 and 88' thereby increasing the depth of the storage box (see FIG. 11).

The trunk 14 is attached by bracket 13 and 13' to the main frame 86. Rear mounting bracket 12 shown in FIG. 2 is also provided. Reinforcement plates 115, 115' are welded onto each side pipe 88 and 88', their upper ends 116 and 116' being placed underneath the fold 112 and each being fastened to the trunk wall 110 by a bolt 117 for distributing the weight.

FIG. 12 shows an outline of the side of a two wheel scooter that embodies yet another version of this invention. The front end of the main frame is comprised of a head pipe 122 fastened to the front end of the main frame 121 with a front fork 133 that pivotally supports a front wheel 131. The head pipe 122 and the front part of the main frame 121 are covered by a body cover 136. The rear of the main frame 121 has a foot rest floor 137.

Figure 19:
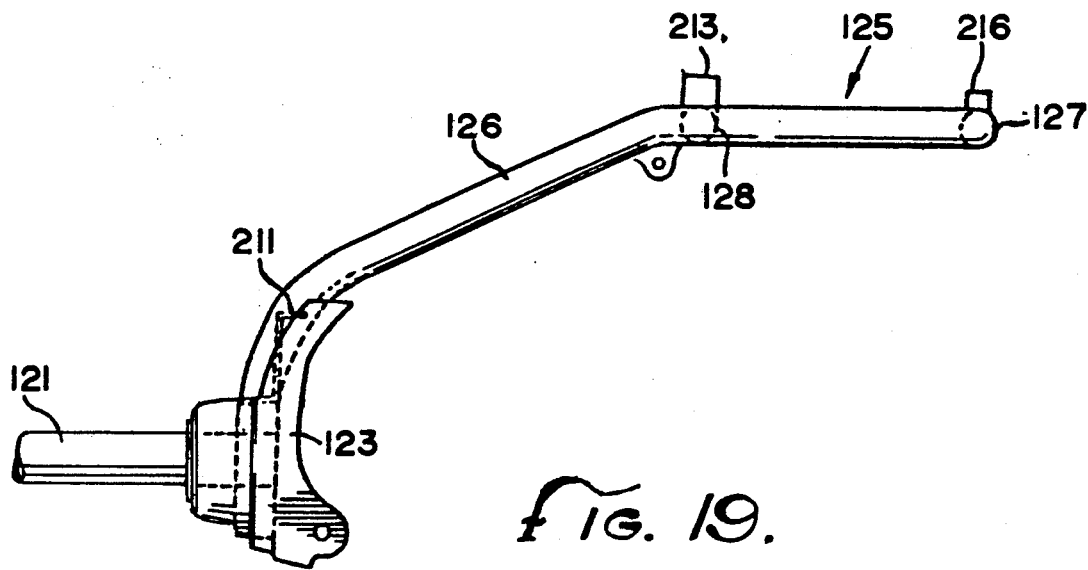
FIG. 19 is a side view of the rear frame.
Figure 20:
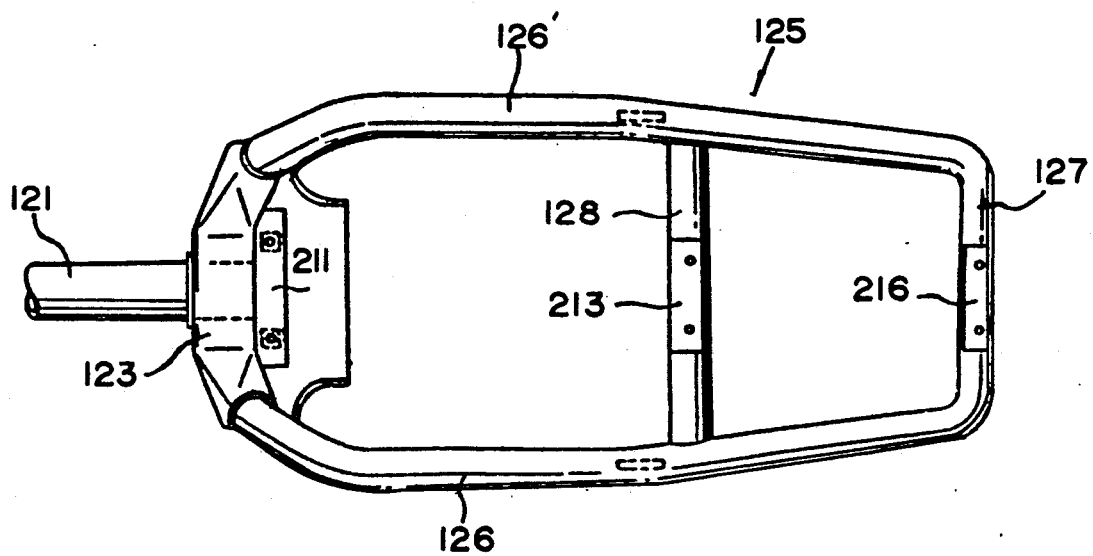
FIG. 20 is a plan view of the rear frame.

A bracket 123 attaches the rear frame 125 to the main frame 121. As shown in FIG. 19 the rear frame 125 has an end pipe 127 between the rear end of the left hand and right hand side pipes 126 and 126' rising rearwardly upward. A cross pipe 128 connects 126 and 126' before the end pipe 127. The sides pipes 126 and 126' are attached to the bracket 123 at the rear end of the main frame 121. As shown in FIG. 12 the power unit 141 consisting of a vertical engine 142 and a transmission case 144 is pivotally supported by the bracket 123 by a link 145, and the rear wheel 146 is supported at the rear portion of the power unit 141 by an axle. Atop the engine 142 is fitted a spark plug cap 143, and a damper, only the centerline 47 of which is provided between the power unit 141 and the rear frame 125. Rear frame 125 is surrounded by a rear body cover 138 which is opened at the top, with a seat 150 placed thereon. In a space under the seat 150 covered by the rear body cover 138 is a storing box or trunk 160 capable of storage of a full face type helmet. A fuel tank 190 and an oil tank 200 are also placed beneath the seat 150 and are surrounded by the body cover 138. In a front lower space of the rear body cover in front of the gusset 123 is placed a battery 148.

The storage box 160 shown in FIGS. 13 and 16 has an inwardly indented portion 162 near the rear part of a bottom wall 161 which slopes downwardly toward the front of the motorcycle. The indented portion provides a space for swinging of the engine 142 and also has an inspection hole 163, the spark plug cap 143 of the engine 142 being located below it. The inspection hole 163 can be opened and closed using inspection lid 164. A rubber seal 166 is provided around the inspection lid 164. A clip 167 attaches the inspection lid 164 to the inspection hole 163. A screw 169 screwed into nut 168 is provided on the underside of the clip 167 (see FIG. 17).

A wall 170 rising around the bottom wall 161 is molded to match the internal space of the rear body cover 138. A hinge mounting 171 is provided at the upper front center portion of the wall 170. Curved edges 172 and 172' are provided on either side of the wall 170 (See FIG. 13). The curved edges 172 and 172' are fitted with a rubber seal 173 and 173' respectively over their entire length. As shown in FIG. 15, the curved edge 172 fitted with the rubber seal 173 is higher than the upper edge of the body cover 138. Large grips 174 and 174' are attached to the curved edges 172 and 172'. On the rear portion of the wall 170 between the grips 174 and 174' is a rear wall 175 rising upwardly. A front rising wall 177 is formed between the curved edges 172 and 172' on the front part of the wall 170. The forward portion of the front rising wall 177 is closed with a front upper wall 178 that is lower than the top of the edges 172 and 172'. Drain holes 179 and 179' are located at the left and right of the front upper wall 178 which projects outward from the front part of wall 170.

To the rear of the storage box 160 is a blind plate 180. The blind plate 180 extends rearwardly from a point lower than the rear rising wall 175 at the rear of the storage box wall 170. The end portion 181 of the blind plate 160 slopes rearwardly upwardly. A circular hole 182 for a fuel tank is provided in the blind plate 180 in front of the slope 161, and another circular hole 183 for an oil tank is positioned to the right of circular hole 182.

On the front right side of the blind plate 180 is a raised portion 184 that surrounds the circular hole 183. A cut-out 185 that connects to the cut-out 176 of the rear rising wall 175 also has a raised portion 186 around the cut-out 185. Installation holes 187 and 187' are located on the front left and right of the blind plate 180. Drain hole 188 is also provided on the blind plate 180 immediately behind the rear rising wall 175. Another drain hole 189 is located at the left front end of the blind plate 180.

The storage box 160 and blind plate 180 are molded from a hard composite material in this embodiment.

The storage box 160 is installed by placing the front part of the bottom wall 161 on top of the bracket 211 which is attached to the bracket 123 of the main frame 121 and fastening with bolts and nuts 212 and 212'. As shown in FIG. 14, a flange 191 of fuel tank 190 is placed upon the bracket 213 which is attached to cross pipe 128 of the rear frame 125, and further attached is a U-shaped stay 221 rising upwardly which is fastened together with bolts and nuts 214 and 214'. A cut-out 222 is located at the upper middle portion of the U-shaped stay 221 and a hook 223 is provided at the lower portion of the cut-out 222 and is always energized in the direction of locking.

The cavity 192 is located beneath the fuel tank 190. A fuel tank 190 has a filler opening 193 and a cap 194 which is fitted to the filler opening 193. The fuel tank 190 is fastened to the front part of the joint flange 191 which attaches to the bracket 213 on the cross pipe 128 of the rear frame 125. The filler opening 193 of the fuel tank 190 projects through the circular hole 182 provided at the center of the blind plate 180. In the cavity 192 provided beneath the fuel tank 190 is placed an oil tank 200. The front portion of the oil tank 200 is indented so that the oil tank 200 can form around a portion of cross pipe 128. A filler opening 203 is provided for oil tank 200 and projects through the circular hole 183 provided that the front side of the blind plate 180, with a cap 184 fitted thereon.

The seat 150 is attached to the storage box 160 by a hinge assembly. A hinge mounting 154 is attached to the seat 150 at the front portion thereof. Another hinge mounting 171 is located at the front upper middle portion of the storage box 160. A hinge 231 attaches to both mountings 154 and 171. A locking mechanism located within cut-outs 176, 185 and 222 closes the seat 150 by engaging a pin 156 with a hook 223. When the hook 223 and the pin 156 are thus engaged, a narrow passage is formed with the wheel end edge 157 of the seat bottom plate 153 and the slope 181 at the rear of the blind plate 180. As shown in FIG. 15, a projecting portion 158 and a seal face 159 comes in close contact with a rubber seal 173 fitted to the curved edge 172 of the top opening of the storage box 160. The projection 158 is thereby substantially adjacent to the inward portion of the curved edge 172, thus preventing the seat from wobbling. The seal also prevents water from penetrating into the storage box. The front rising wall 177 and the rear rising wall 175 also prevent water that penetrates beneath the seat 150 from further penetrating into the storage box 160. Water that penetrates onto the front of the wall 178 of the blind plate 180 can be drained downward through the respective drain holes 179, 188, and 189.

The blind plate 180 by being placed lower than the rear upper edge of the box wall 170 or the rear rising wall 175, prevents fuel or oil spilled onto the blind plate 180 during filling through the filler openings 193 and 203 from entering into the storage box 160, by draining the spilled fluids through the drain holes 188 and 189. Also, the raised portion 184 around the oil tank filler opening 203 insures that spilled oil will be drained through drain hole 183. The raised portion 186 around the cut-out 185 prevents fuel from entering into the cut-out 185 and therefore into the storage box 160.

Also, when the inspection lid 164 of the bottom wall 161 of the storage box 160 is removed, the plug cap 143 located below the inspection hole 163 can be easily reached for maintenance, inspection, or replacement.

Figure 21:
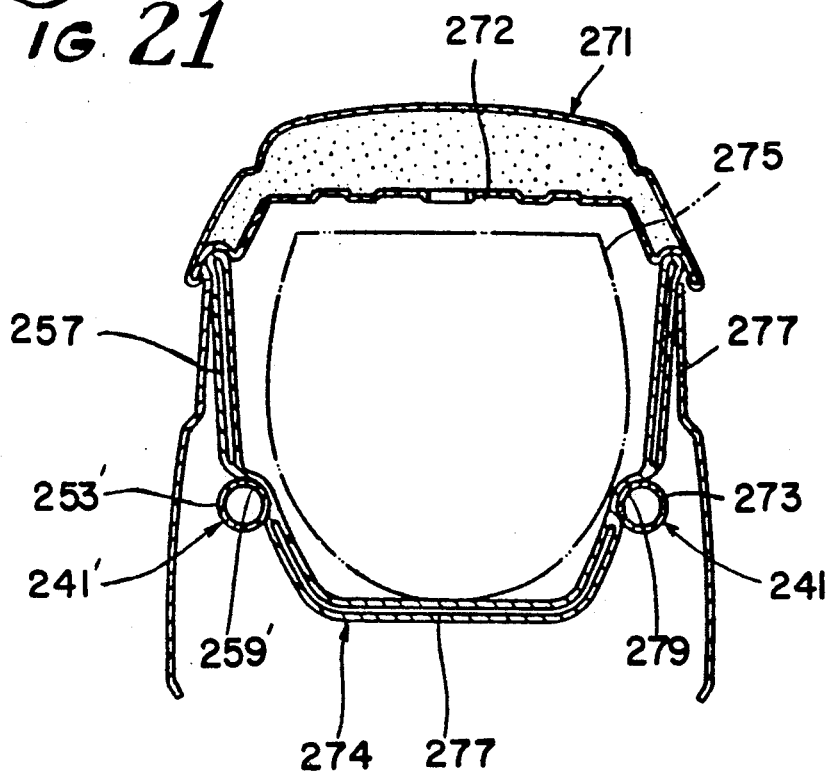
FIG. 21 is a cross-section of a motorcycle showing another embodiment of the invention.
Figure 22:
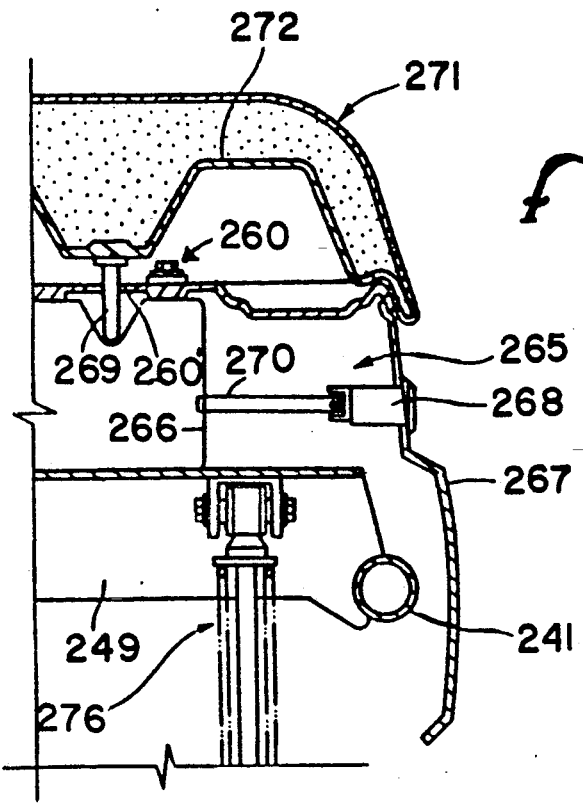
FIG. 22 is a sectional side view of a locking mechanism that comprises a portion of the alternate embodiment of FIG. 21.

FIG. 21 shows an alternate embodiment of the present invention in which the bottom wall and the peripheral wall of the trunk 254 of a double wall construction having a hollow portion inside. These double walls are made by blow molding. In making the walls of the storage box 254 double walls, the insulating characteristic of the storage box is improved.

At the front lower portion of the storage box 254 is a singular wall seating mount, and on the left hand and right hand side of the storage box 254 are seating mounts 259 and 259'.

At the rear portion of the upper edge of the storage box 254 is a seating mount 260, a cut-out 260' formed therein.

The trunk 254 is attached to frames 241 and 241' by fastening the front seating mount (not shown) to a front bracket and the seating mount 260 at the rear portion of the storage box 254 to the support bracket 252. The storage box 254 is further attached to the frames 240 and 241 by fitting the seating mounts 259 and 259' which are on the left hand and right hand side of the storage box 254 to the storage box mountings 253 and 253' attached to the frames 241 and 241'.

A seat locking mechanism 265 has a hook engaging lever 266 swingably mounted on a support bracket 252 and is key operated by a key operating section 268 on the side cover 267. Release of a hook 269 engaged by the hook engaging lever is accomplished by inserting the key into the key operating mechanism 268 and rotating the key. Rotating the key causes the connecting rod 270 to engage or disengage the hook from the hook engaging lever 266. The hook, installed through cut-out 260' keeps the seat 271 from shaking laterally when engaged with the hook engaging lever 266.

While embodiments and applications of this invention have been shown and described, it would be apparent to those skilled in the art that many more modifications are possible without departing from the invented concepts herein. The invention, therefore, is not to be restricted except in the spirit of the appended claims.

What is claimed is:

1. A scooter-type vehicle comprising a body frame structure including a low bed step floor positioned forwardly of a rear body portion, a seat, a power unit defined by an integrated engine and transmission mechanism for transmitting engine output to a rear wheel, a storage box in said rear body portion located below said seat and above said power unit, said storage box comprising plate means including structurally rigid wall plates secured to and upstanding from said body frame structure, the upper ends of said wall plates defining a storage box opening vertically supporting said seat and having means at the front side thereof for pivotally attaching said seat, means for pivotally mounting said power unit to said body frame structure for vertical movement beneath said storage box, a rear body cover spacedly enclosing said storage box, and a fuel tank disposed rearwardly of said storage box between said storage box and said rear body cover.

2. A vehicle according to claim 1 characterized in that said storage box has a bottom plate located in proximity to said power unit and sloping rearwardly upwardly, and a front wall inclined forwardly with respect to the longitudinal axis of said vehicle to provide said storage box with a luggage storage capacity.

3. A vehicle according to claim 2 characterized in that said storage box bottom plate is contoured to prevent contact by said pivotally mounted power unit with said storage box.

4. A vehicle according to claim 3 characterized in that said seat extends longitudinally of said body frame structure and further in that there is at least one additional tank located beneath the rear end of said seat, and the body cover substantially enclosing said at least one additional tank, frame structure and said storage box.

5. A vehicle according to claim 4 characterized in that said storage box is disposed forwardly of said at least one tank.

6. A vehicle according to claim 5 characterized in that a substantially horizontally extending blind plate is provided between said body cover and said storage box, said blind plate containing openings adapted to receive filler openings of said tanks.

7. A vehicle according to claim 6 characterized in that said blind plate is attached to said storage box, and distinct mounting means securing said storage box and said blind plate to said frame structure.

8. A vehicle according to claim 7 characterized in that a partition wall extends upwardly from said blind plate between said tank filler receiving opening and said top openings of said storage box.

9. A vehicle according to claim 3 characterized in that said power unit comprises an engine having a substantially upstanding, rearwardly inclined cylinder.

10. A vehicle according to claim 3 characterized in that said power unit contains a substantially vertical engine having a forwardly extending cylinder.

11. A vehicle according to claim 10 characterized in that said power unit includes an air cleaner and a carburetor disposed on opposite sides of said engine, and said power unit being pivotally mounted to said frame structure at a point substantially immediately above said cylinder.

12. A vehicle according to claim 2 characterized in that said storage box has sufficient luggage storage capacity to store at least one helmet.

13. A vehicle according to claim 12 characterized in that said front wall and said rear wall are combined with sides walls to define said luggage storage capacity.

14. A vehicle according to claim 12 characterized in that said storage box is arranged for storage of said helmet in an upright attitude with the eternal surface thereof disposed substantially coincident with the contour of said upwardly sloping bottom plate.

15. A vehicle according to any one of claims 1, 12 or 13 characterized in that a fuel tank is disposed in close proximity rearwardly of said storage box.

16. A vehicle according to any one of claims 1, 12 or 13, characterized in that at least one additional tank is located within said body cover behind said storage box under a rear part of said seat.

17. A vehicle according to claim 16 characterized in that the additional tank disposed in close proximity to said storage box is an oil tank.

18. A vehicle according to claim 16 characterized in that a blind plate is disposed between said body cover and said storage box, said blind plate being provided with at least one opening positioning a filler opening of said at least one additional tank.

19. A vehicle according to claim 18 characterized in that said blind plate and said storage box bottom plate are connected to said body frame structure by distinct mounting means.

20. A vehicle according to claim 1 characterized in that the lowermost portion of said storage box is located in close proximity to said power unit and lower than the highest position of said rear wheel.

21. A vehicle according to claim 1 characterized in that said body frame structure comprises a pair of frame members extending substantially parallel to the longitudinal axis of said vehicle on opposite sides of said storage box, said storage box being mounted on said frame members and having a bottom portion extending therebelow.

22. A vehicle according to claim 21 characterized in that said storage box opening has a width dimension substantially perpendicular to said vehicle axis that is greater than the distance between said frame members.

23. A vehicle according to claim 21 characterized in that said storage box bottom portion projects downwardly with the bottommost portion thereof being located between said rear wheel and a power unit pivot support.

24. A vehicle according to claim 23 characterized in that said storage box bottom portion is inclined upwardly from the portion proximate said power unit toward the wall plate at the rear of said storage box adjacent the upper end of said rear wheel.

25. A vehicle according to claim 24 characterized in that said storage box bottom plate contains an access opening to said power unit, and removable closure cover closing said opening.

26. A vehicle according to claim 25 characterized in that said access opening opens to a spark plug on said power unit.

27. A vehicle according to claim 1 characterized in that said storage box plate means are formed substantially of a hard, composite material.

28. A vehicle according to claim 1 characterized in that said plate means comprise a double wall construction having an air space formed therebetween.

29. A vehicle according to claim 1 in which the wall plates of said storage box are arranged to store a helmet and are configured to conform generally to the peripheral shape of said helmet.

30. A vehicle according to claim 1 characterized in that said power unit is disposed in close proximity to a bottom portion of said storage box and includes an engine having a horizontally disposed cylinder, an air cleaner fixed to said engine on one side of said cylinder and a carburetor interposed in a suction passage between said air cleaner and said engine.

* * * * *